May 1, 1928.
N. PAINE
1,667,904
CORE BLOCK ASSEMBLING APPARATUS
Filed Sept. 15, 1927
3 Sheets-Sheet 1
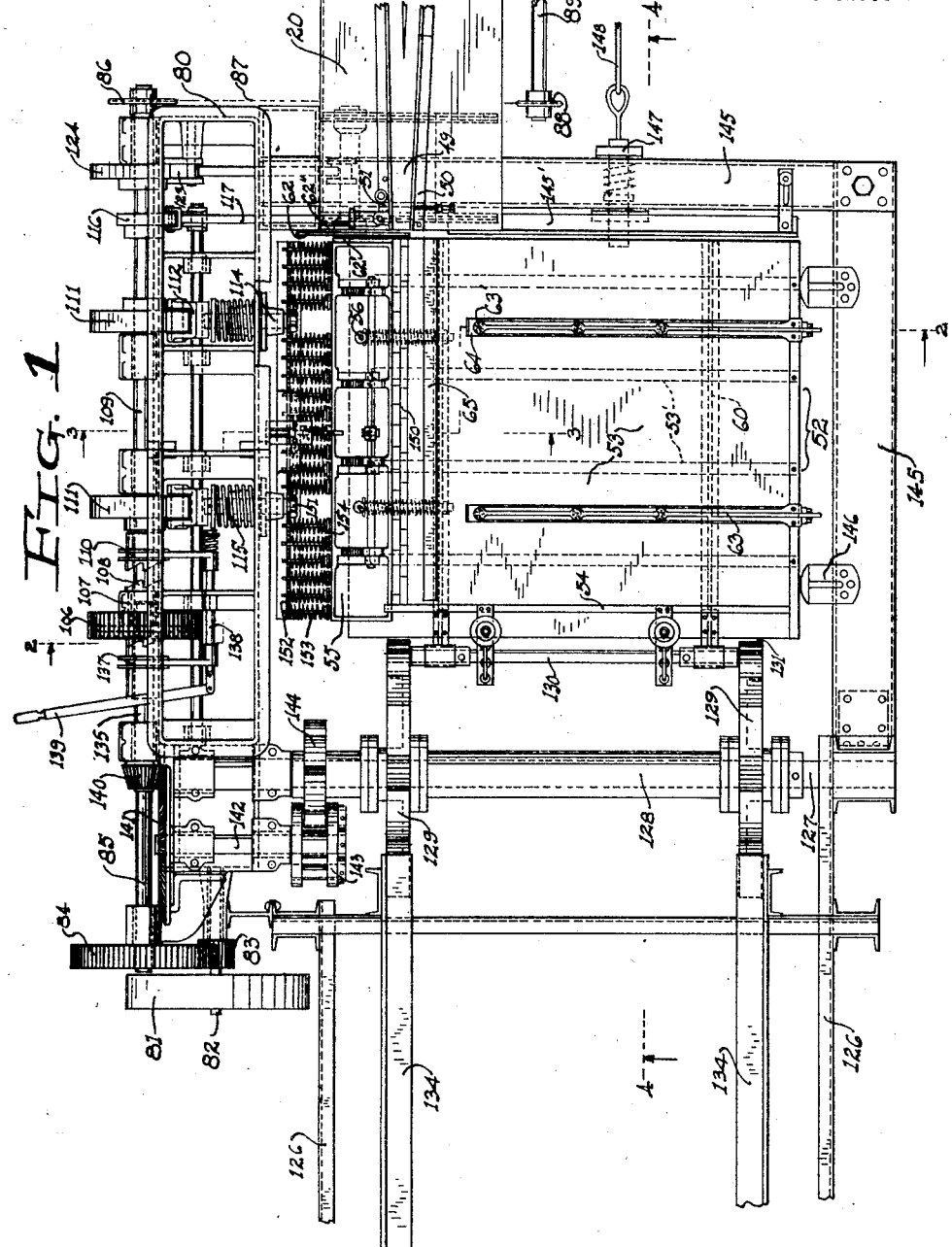
WITNESSES
Irving J. Rose
M. E. Downey
INVENTOR.
Nathan Paine
BY
R. S. Caldwell
ATTORNEY.

May 1, 1928.  
N. PAINE  
1,667,904  
CORE BLOCK ASSEMBLING APPARATUS  
Filed Sept. 15, 1927 3 Sheets-Sheet 2
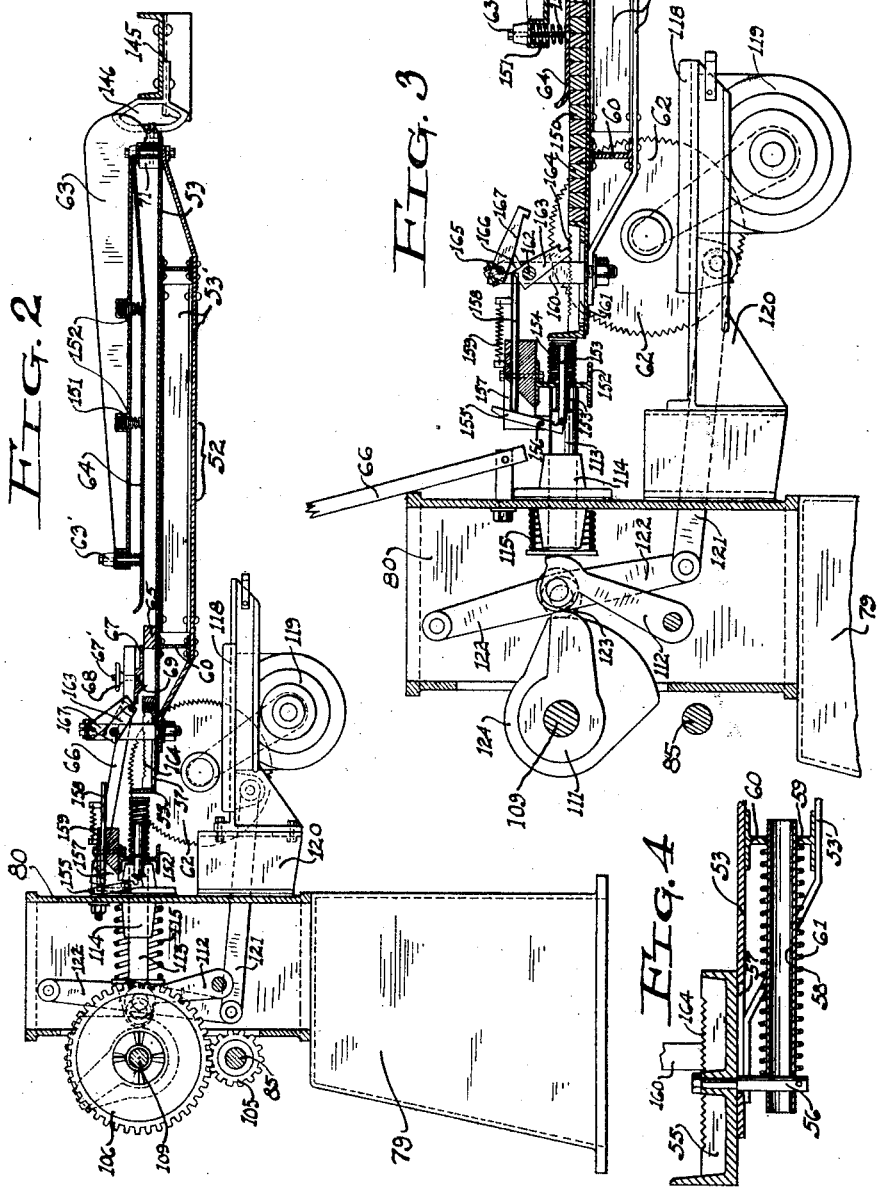
WITNESSES  
INVENTOR.  
Nathan Paine  
BY  
ATTORNEY.

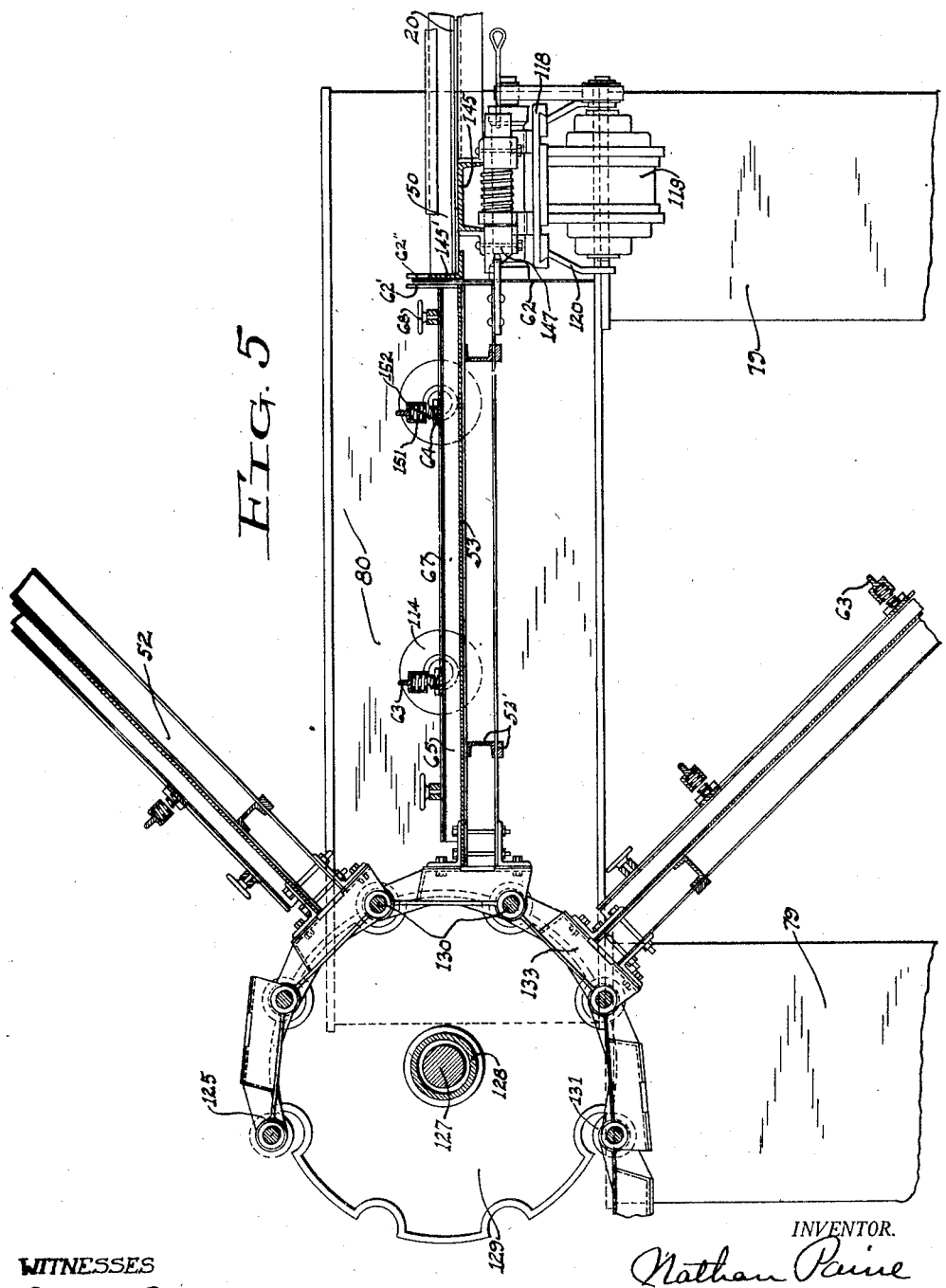

Patented May 1, 1928.

1,667,904

UNITED STATES PATENT OFFICE.

NATHAN PAINE, OF MIAMI BEACH, FLORIDA, ASSIGNOR TO MIRACLE DOOR COMPANY OF DELAWARE, OF OSHKOSH, WISCONSIN, A CORPORATION OF DELAWARE.

CORE-BLOCK-ASSEMBLING APPARATUS.

Application filed September 15, 1927. Serial No. 219,767.

The invention relates to core block assembling apparatus and has for an object the provision of a plurality of assembling trays successively movable to filling position for receiving work pieces thereon in laterally adjacent rows, there being a common yielding means for placing under lateral compression the group of work pieces on each tray.

Another object of the invention is to provide each tray with locking means for retaining a group of work pieces thereon under lateral compression, the locking means on the several trays being controlled by a mechanism common to all the trays.

A further object is to provide a core block assembling tray receiving successive rows of work pieces thereon laterally displaced by a reciprocable pusher bar, there being provided locking means acting on said bar to lock the bar in variable clamping position when the tray is filled with work pieces.

A further object of the invention is to provide novel pressing means mounted on and spaced above each tray for frictionally engaging and supporting the work pieces during the process of forming the core.

The invention further consists in the features hereinafter set forth and more particularly defined by the annexed claims.

In the accompanying drawings,

Fig. 1 is a plan view of a core block assembling machine embodying the invention;

Fig. 2 is a sectional elevation thereof taken on the line 2—2 of Fig. 1;

Fig. 3 is a fragmentary sectional elevation taken on the line 3—3 of Fig. 1, showing the assembling tray with its contents locked in place;

Fig. 4 is a detail sectional view showing the means for retracting a pusher bar on the tray; and Fig. 5 is a fragmentary sectional elevation taken on the line 4—4 of Fig. 1 showing the assembling trays and their carrier.

In these drawings, the numeral 20 designates a table having formed thereon a guide channel or passage 49, in which one or more rows of core blocks or work pieces 150 are guided for longitudinal movement, provision being made for two laterally adjacent rows of work pieces in the present instance. The channel or passage 49 is formed at one side by a laterally adjustable angle 50 and at the other side in part by a pivotally movable clamping member 51, which latter is periodically actuated by cam mechanism hereinafter described to effect the clamping of the work pieces within the channel. The discharge end of the channel 49 registers with the open side of an assembling tray 52 to load thereon successive double rows of work pieces.

In the present instance each tray comprises a flat metal plate 53 re-enforced on its under side by various structural members 53' and 60 riveted thereto and to each other. The tray carries at the side opposite and distant from the channel 49 an abutment strip 54, which limits the forward movement of the rows of work pieces as they are fed onto the tray and places the ends of these rows in alignment. In order to vary the size of the core block to be assembled on the tray 52 the abutment strip 54 is mounted for lateral adjustment.

At the end of the assembling tray adjacent the channel 49 and in parallel relation thereto is mounted a pusher bar 55, which is adapted for periodic lateral reciprocation, as hereinafter described, to laterally displace successive rows of work pieces in order to provide room for following rows of work pieces directly in line with the discharge end of the channel 49. The pusher bar has secured thereto depending studs 56, each of which projects through a slot 57 in the tray plate 53, as seen in Fig. 4, and each being secured to one end of a tube 58, which has its other end slidably mounted in an opening 59 formed in the re-enforcing member 60 below the plate. The tube 58 is surrounded by a compression coiled spring 61, which is interposed between the re-enforcing member 60 and the stud 56 and thus urges the stud-bearing pusher bar to its rearward position, as shown in Figs. 1 and 2.

A circular saw 62 reciprocated as hereinafter described is placed between the tray and the discharge end of the channel 49 to cut off the work pieces at the edge of the tray after each double row of work pieces is on the tray and before the lateral displacement of these rows by the pusher bar.

Spaced cantilever arms 63 secured to the end of the tray opposite the pusher bar extend lengthwise of the tray in spaced relation to the tray plate 53, and each carries at its outer end a depending stud 63', which is spring-urged downwardly. The stud supports at its lower end a presser strip 64 extending in parallel relation to the superposed arm 63, the presser strip being also anchored to the arm near the edge of the tray.

Each cantilever arm 63 is provided with pockets 151 in its under face, in which are placed coiled springs 152 bearing downwardly on the presser strip 64. A follower bar 65 is slidably movable on the plate 53 in parallel relation to the pusher bar 55 to preserve the alignment of the displaced rows of work pieces, the follower bar being frictionally retained under the presser strips 64 in the intervals between the lateral displacement of the collected rows of work pieces on the tray.

Above the end portion of the tray 52 adjacent the pusher bar 55 are placed spaced arms 66, each of which is pivotally mounted on a housing 80 hereinafter described, for movement in a vertical plane. The free ends of the arms 66 are spaced above the work pieces entering on the tray and an elongated plate or shoe 67 extends beneath and between these free ends and is secured thereto by means of upstanding studs 67', to which are threaded hand wheel nuts 68, by means of which the plate may be laterally adjusted in a horizontal direction. The plate 67 carries a depending longitudinal rib 69 of V-shaped cross-section, which extends along the newly introduced rows of work pieces to prevent their lateral toppling, the rib being laterally adjustable with the plate as above noted to accommodate different widths of work pieces. The plate 67 with its depending rib is lifted out of the way by the lateral displacement of the newly introduced rows of work pieces but again falls into position, the outer portions of the plate then resting on the upper edges of the displaced work pieces. At such time when the tray is ready to receive its first rows of work pieces this part of the plate rests on the follower bar to properly space the plate 67 above the plate 53 of the tray. When changing trays, as hereinafter described, the pivoted arms 66 are lifted out of the way to the position shown in Fig. 3 of the drawings.

Base pedestals 79 support an elongated housing 80 (hereinbefore noted), which is disposed laterally of the assembling tray 52 adjacent the end thereof receiving the pusher bar 55. A drive pulley 81 is keyed to a stud shaft 82 journalled in a projecting terminal portion of the housing, the shaft 82 carrying a pinion 83, which meshes with a gear 84. The gear 84 is secured to one end of a shaft 85, which is journalled at several points along the side of the housing 80, the other end of the shaft carrying a sprocket 86 connected by a transmission chain 87 to another sprocket 88 secured to a shaft 89. The shaft 89 drives block feeding mechanism, not shown, by means of which the blocks are urged along the guide channel 49 hereinbefore described. The block feeding mechanism, however, forms no part of the present invention and is shown in applicant's copending application Serial No. 219,766, filed September 15, 1927.

The shaft 85 has keyed thereto a pinion 105, which meshes with a superposed gear 106 journalled in a bearing 107, the opposite ends of the gear hub having clutch teeth 108 formed therein. A cam shaft 109 coaxial with the gear 106 is journalled at several points along the housing 80 and has a jaw clutch member 110 splined thereon for interengagement with one set of clutch teeth 108 on the gear 106. Pusher bar operating cams 111 are keyed to the cam shaft 109 and have the general profile shown in Fig. 3 of the drawings. Each of the cams 111 is engageable with a roller tappet lever 112 pivotally mounted in the housing 80 and this lever is in turn engageable with the end of a horizontal plunger 113 slidably mounted in a bushing member 114 carried in the side wall of the housing 80 adjacent the pusher bar 55. A coiled spring 115 surrounds each plunger 113 within the housing 80 to effect the recession of the plunger. The plungers 113 are connected by means hereinafter described for effecting the periodic displacement of the pusher bar 55.

Another cam 116 secured to the cam shaft 109 has a rolling engagement with one end of a connecting rod 117, which is pivotally connected at its outer end to the movable clamping member 51 forming, in part, one wall of the guide channel or passage 49 from which the work pieces are fed onto the assembling tray 52.

The cut-off saw 62 previously noted is mounted on a carriage 118 and is belt-driven from an electric motor 119 depending from the carriage. The saw carriage 118 is mounted for horizontal reciprocation on a bracket 120 projecting from the side of the housing 80, and a link 121 is pivotally connected between the carriage and the lower free end of an arm 122 pivotally mounted at its upper end within the casing 80. The arm 122 is provided with a roller 123 which is engaged by a cam 124 on the cam shaft 109 to effect the periodic reciprocation of the saw carriage 118 through the intermediate linkage. The saw is guarded at one side by an upstanding plate 62' secured to the tray and at the other side by a plate 62" secured to the table 20.

In the present instance the assembling tray is one of a series of trays mounted on the links of an endless chain or belt 125. A suitable framework 126 is provided at one end of which is mounted a stationary horizontal arbor 127 disposed adjacent the housing 80 and carrying thereon a tubular shaft 128, which has secured thereon in axially spaced relation a pair of sprockets 129. The tray conveyer chain includes a plurality of pintles 130 which carry rollers 131 at opposite ends engageable in the notches of the spaced sprockets 129. Two spaced rows of links 133 are carried by the pintles 130 and each laterally spaced pair of links is provided with pads on which one of the assembling trays 52 is bolted or otherwise firmly secured, as seen in Fig. 4. The framework 126 includes angle trackways 134 on which the pintle rollers ride to avoid sagging of the chain and undue tension thereon. At the opposite end of the framework 126 (not shown) the chain may be supported in any suitable manner, as by a sprocket mounting identical with that above noted. A guide angle 145' is mounted on the frame 145 to lie near and parallel to the outer edge of the tray.

A shaft 135 is journalled on the housing 80 in coaxial relation with the gear 106 on the side thereof opposite the cam shaft 109. A jaw clutch member 137 is splined on the shaft 135 for engagement with the adjacent clutch teeth 108 on the gear 106. The jaw clutch members 110 and 137 on the cam shaft 109 of the shaft 135 respectively are connected by a fork-shifting member 138 for alternative connection with the gear 106, and a hand lever 139 is operatively connected to the shifting lever 138 to effect such alternative connection or the release of both of these shafts from their driving connection. The shaft 135 has keyed thereon a bevel pinion 140 which meshes with a bevel gear 141 carried at one end of a shaft 142, which is provided at its other end with a pinion 143. The pinion 143 meshes with a gear 144 secured to the tubular shaft 128, on which is mounted the sprockets 129 receiving the tray-conveying chain. By this means the tray-conveying chain is moved at will alternatively with the operation of the tray-filling mechanism.

A framework 145 partially surrounds the assembling tray 52 in its filling position and carries a pair of bumpers 146, against which the end of the tray bears to take the thrust of the tray during the filling and clamping operations. A latch 147 is operated from a cable 148 and engages the outer edge portion of the tray to lock the tray in its proper position during the tray-filling operation.

The reciprocable cam-operated plungers 113 have their outer ends connected by bolts 151 to the web of a horizontal I-beam 152 disposed in spaced parallel relation to the pusher bar 55. The web of the I-beam 152 carries a plurality of parallel horizontal plungers 153 surrounding each of which is a pair of coiled springs 154, the free ends of the plungers being disposed in alignment for simultaneously engaging the side of the pusher bar 55. The inner end portion of one of the plungers 153 is slidably mounted in a guide bushing 153' carried by the web of the channel of the I-beam 152 and has its inner end engageable with the lower end of a lever 155 pivotally mounted intermediate its ends on a pin 156 secured in a block 157 fastened to the I-beam 152. The upper portion of the lever 155 is engageable with the end of a horizontal plunger 158 disposed transversely of the I-beam 152 and slidably mounted in the block 157, the plunger 158 being normally held in retracted position by a coiled spring 159.

Spaced upstanding studs 160 are secured to the tray 52 adjacent the loading end thereof and project through transverse slots 161 formed in the pusher bar 55. A horizontal shaft 162 is journalled in the upstanding studs 160 above the tray and has secured thereto a plurality of spaced depending pawls or dogs 163 which are engageable with the upper toothed surface of spaced ribs 164 extending transversely of the pusher bar 55 and formed integral therewith, if desired. A horizontal shaft 165 disposed above and in parallel relation to the shaft 162 is also journalled in the upstanding studs 160 and has secured thereon a trip lever 166 and a latch lever 167, which latter has a hooked end engageable with the notched end of one of the pawls 163 to retain the set of pawls in elevated position during the tray-filling position. The trip lever 166 is engageable by the outer end of the plunger 158, however, to lift the latch lever 167 and thereby permit the fall of the pawls 163 into engagement with the toothed ribs 164, thereby locking the pusher bar 55 in its forward position when the assembling tray 52 is filled.

In operation, the core blocks or pieces of waste wood 150, of uniform rectangular cross section and of varying lengths, are fed in double contiguous rows in the channel or passage 49, from which they are discharged or projected in a rapid stream onto the table 53 of the assembling tray 52, the tray being retained in register with the channel by means of the latch member 147 engaging the tray. The work pieces moving in the channel 49 have been previously given a coat of glue at one side in any suitable manner. When the rows of work pieces entering the tray abut against the stop strip 54 at the opposite side of the table the progress of these rows is stopped and shortly thereafter the cam 116 on the cam shaft 109, which is now placed in operation, acts through the link 117 to move the pivotally mounted clamping member 51 and thereby firmly clamp the two rows of work pieces in the channel 49. Following this operation the saw carriage 118 is reciprocated by means of the cam 124 on the cam shaft 109 and the circular saw 62 thereupon cuts off the ends of the work pieces projecting from the adjacent edge of the tray. The saw carriage is thereupon retracted and the pusher bar 55 is operated by means of the plunger bar 152 and cams 111 to laterally displace these rows of work pieces. In their lateral movement these work pieces raise the pivotally mounted supporting plate 67 under which they pass in lateral engagement with the follower 65, the latter serving to maintain the alignment of the rows of work pieces. The pusher 55 is then retracted by means of the springs 61 and the clamping member 51 of the channel 49 is then released to permit another double row of work pieces to be rapidly projected across the table of the tray. The above noted sequence of operations is then repeated and the rows of work pieces pass beneath the presser strips or bars 64, under which they are frictionally retained. If for any reason it is desirable to stop the operation of the cam shaft 109 during the filling operation, this can be done by placing the shifting lever 139 in its neutral position without stopping other rotating shafts.

During the tray-filling operation the end thrust on the tray is taken by the bumpers 146 and when the tray is filled the follower bar 65 contiguous with the foremost row of work pieces engages the bar 71 before the pusher bar 55 completes its stroke. The spring plungers 153 on the plunger bar 152 are thereupon placed under compression, which in turn places the entire contents of the tray under compression to thereby effect the firm adhesion of the adjacent rows of work pieces, one side of each row having been previously glue coated. When the spring plungers 153 stop in their movement and are placed under compression the upper end of the lever 155 on the plunger bar 152 is caused to swing forwardly, which displaces the tripping plunger 158 in a forwardly direction faster than the advance of the plunger bar 152. The tripping plunger 158, in turn, swings the tripping lever 166, thereby lifting the latch lever 167 and permitting the pawls 163 to drop and engage the toothed ribs 164 of the now stationary pusher bar 55. The pusher bar 55 is thus locked in place to retain the rows of work pieces on the tray in lateral compression, and immediately thereafter the cam shaft 109 is stopped in operation by manipulation of the shifting lever 139. The pivotally mounted bars 66 are then swung upwardly to the position shown in Fig. 3 to place them clear of the tray. The latch 147 is then released by means of its cable 148 to free the now filled tray 52 from the frame 145, and the tray conveyer chain 125 is then set in motion by operatively connecting it to the gear 106, this being accomplished by manipulating the shifting lever 139 in a direction to engage the clutch member 137 with the clutch teeth 108 on the gear. The tray conveyer is left in operation just a sufficient length of time to elevate the now filled tray and to place in filling position the next succeeding tray which is then retained by the latch 147.

Succeeding trays are filled with work pieces in a manner similar to that just described and the work pieces in the filled trays during the travel of the trays back to their original position are kept under pressure sufficiently long to permit the glue to set. Just before each tray again reaches its filling position the pawls 163 are released from the pusher bar 55, thereby releasing the core and permitting it to be removed from the tray. The finished cores are set aside to dry, after which they are sawed into various widths according to requirements.

It will be understood that the work pieces forming the core may be of various lengths, and that the term "row of work pieces", as applied to the work pieces on the tray, may indicate a single work piece of suitable length.

By means of this invention the manufacture of cores for millwork purposes can be carried out in an economical, rapid and expeditious manner, eliminating much of the hand labor which was previously needed in the manufacture of these articles.

What I claim as new and desire to secure by Letters Patent is:

1. In a core block assembling machine, the combination of a tray receiving thereon successive rows of work pieces, and yielding means for intermittently laterally displacing said rows to make room for succeeding rows at the same place on the tray.

2. In a core block assembling machine, the combination of a tray receiving laterally adjacent glue-coated work pieces, and yielding pressing means distinct from the tray for laterally compressing said work pieces into adhesion to form a core.

3. In a core block assembling machine, the combination of a plurality of movable trays each adapted to receive adjacent rows of glue-coated work pieces, means for retaining said trays successively in filling position, and common yielding means for effecting the lateral compression of the work pieces in each filled tray.

4. In a core block assembling machine, the combination of a tray receiving thereon laterally adjacent glue-coated work pieces, a reciprocable pusher member for laterally displacing the work pieces on the tray to provide room for succeeding work pieces, a stop on said tray for limiting the movement of said laterally displaced work pieces when the tray is filled, pressing means engageable with said pusher member for placing the work pieces in the filled tray under lateral compression, and means for locking said pusher member to said tray in any one of several relative positions to retain said work pieces under said lateral compression.

5. In a core block assembling machine, the combination of a tray receiving laterally adjacent glue-coated work pieces, a reciprocable pusher member for laterally displacing the work pieces on the tray to provide room for succeeding work pieces, a stop on said tray for limiting the movement of said laterally displaced work pieces when the tray is filled, yielding pressing means distinct from said tray engageable with said pusher member for placing the work pieces in said tray under lateral compression, and means controlled by said pressing means for locking said pusher member on said tray to retain said work pieces under said lateral compression.

6. In a core block assembling machine, the combination of a tray receiving laterally adjacent rows of glue-coated work pieces, a pusher member and a stop disposed on said tray in spaced relation for receiving said work pieces between them, means engageable with said pusher member for placing said work pieces under lateral compression, and means for locking said pusher member in compressing position including the locking member engageable with any one of several locking recesses for permitting variations in the size of the core formed by said work pieces.

7. In a core block assembling machine, the combination of a tray receiving laterally adjacent glue-coated work pieces, a laterally reciprocable pusher bar mounted on said tray for laterally displacing the work pieces on said tray, a reciprocable presser bar for moving said pusher bar and having a resilient connection therewith, a stop carried on said tray and spaced from said pusher bar for receiving said work pieces therebetween, a pawl carried on and above said tray, said pusher bar having a plurality of shoulders against which said pawl is engageable for restraining the retraction of said pusher member, a latch member normally holding said pawl out of engagement with said shoulders for permitting the free reciprocation of said pusher member, a member carried on said presser bar and movable forwardly relative thereto for effecting the release of said pawl from said latch member, and means operated on the compression of said presser member to displace said pawl-releasing member whereby to effect the engagement of said pawl with said pusher bar for retaining said pusher bar in compressing position.

8. In a core block assembling machine, the combination of a tray receiving laterally adjacent glue-coated work pieces, a cantilever arm secured at one end of said tray and extending therebetween, a presser strip carried by said arm in spaced relation to said tray and having a resilient mounting on said arm, and displacing means for moving said work pieces laterally under said presser strip.

9. In a core block assembling machine, the combination of a tray receiving laterally adjacent glue-coated work pieces, a support spaced above said tray and extending thereacross, a presser strip disposed beneath said support in spaced relation to said tray, said support having downwardly opening spring pockets, coiled springs disposed in said pockets and bearing downwardly on said presser strip, and means for carrying said presser strip on said support and limiting its downward movement toward said tray.

10. In a core block assembling machine, the combination of a movable tray receiving laterally adjacent glue-coated work pieces, a support from which said work pieces are longitudinally projected onto said tray, means for laterally displacing said work pieces from their entering position on said tray, a second support, and guide means pivotally mounted on said support for preventing the toppling of newly introduced work pieces on said tray, said guiding means being upwardly movable by the lateral displacement of said work pieces and being capable of a further upward movement to an offset position permitting the free movement of said tray.

In testimony whereof I affix my signature.

NATHAN PAINE.